United States Patent [19]

Nakamura

[11] Patent Number: 5,186,422

[45] Date of Patent: Feb. 16, 1993

[54] STAND APPARATUS FOR MEDICAL OPTICAL INSTRUMENT

[75] Inventor: Katsushige Nakamura, Tokyo, Japan

[73] Assignee: Kesanori Sahara, Tokyo, Japan

[21] Appl. No.: 822,499

[22] Filed: Jan. 17, 1992

[51] Int. Cl.⁵ .............................................. F16L 3/00
[52] U.S. Cl. ................................. 248/123.1; 248/280.1;
248/281.1; 359/382
[58] Field of Search ............... 248/162.1, 123.1, 281.1,
248/280.1; 359/382; 414/917, 719, 738, 749

[56] References Cited

U.S. PATENT DOCUMENTS

| | | | |
|---|---|---|---|
| 3,809,454 | 5/1974 | Brambring | 359/382 |
| 3,877,778 | 4/1975 | Heller | 359/382 X |
| 4,241,891 | 12/1980 | Rudolph | 248/123.1 |
| 4,364,535 | 12/1982 | Itoh | 248/280.1 X |
| 4,402,646 | 9/1983 | Rouzo | 414/719 |
| 4,531,816 | 7/1985 | Baumgartel | 359/382 |
| 4,548,373 | 10/1985 | Komura | 248/280.1 X |
| 4,684,088 | 8/1987 | Heller | 248/123.1 X |
| 4,741,607 | 5/1988 | Heller | 248/280.1 X |
| 4,881,709 | 11/1989 | Nakamura | 248/123.1 |
| 4,912,388 | 3/1990 | Tanaka | 359/382 X |

FOREIGN PATENT DOCUMENTS 0023003 7/1980 European Pat. Off. ......... 248/280.1

2416106 2/1975 Fed. Rep. of Germany ...... 359/382

Primary Examiner—J. Franklin Foss
Attorney, Agent, or Firm—Jordan and Hamburg

[57] ABSTRACT

In a stand apparatus for a medical optical instrument, a first link mechanism including a first pantograph arrangement has a proximal end which is mounted on a body having a horizontal groove. The body is rotatable about a vertical axis. The first pantograph arrangement has an intermediate section which is slidably engaged within the horizontal groove. The first pantograph arrangement reciprocating linearly along a horizontal direction has a forward end on which a horizontal moving element having a vertical groove is mounted. A second link mechanism including a second pantograph arrangement has a proximal end which is mounted on the horizontal moving element. The second pantograph arrangement has an intermediate section which is slidably engaged within the vertical groove in the horizontal moving element. The medical optical instrument is supported at a forward end of the second pantograph arrangement which reciprocates linearly along a vertical direction. A counter weight for canceling a weight of the medical optical instrument is provided within the first link mechanism.

2 Claims, 8 Drawing Sheets

STAND APPARATUS FOR MEDICAL OPTICAL INSTRUMENT

BACKGROUND OF THE INVENTION

1. Field of the Invention

The present invention relates to a stand apparatus capable of moving a medical optical instrument freely in a horizontal direction and in a vertical direction.

2. Description of the Prior Art

Cerebral surgery operation, heart surgery operation and the like are executed while observing an affected or diseased part by an operation microscope serving as "Medical Optical Instrument", and are operations which are very fine and which are nervous or strain operator's nerves. There are many cases where operation time is long. It is not preferable for a patient and a doctor or a physician that operation time is lengthened, because a fatigue increases bodily and mentally. Since the medical optical instrument is heavy in weight, the medical optical instrument is used so as to be supported by a stand apparatus. It is depending upon performance of the stand apparatus whether or not the medical optical instrument is positioned on an objective part (affected or diseased part) accurately and rapidly.

In view of the above, the inventor of the present application has previously proposed a stand apparatus which is suitable for supporting such medical optical instrument (refer to Japanese Patent Laid-Open No. SHO 64-56409).

SUMMARY OF THE INVENTION

This invention further improves such prior stand apparatus, and is arranged such that it is possible to move the medical optical instrument in horizontal and vertical directions straight, and it is possible to secure a large amount of movement. It is an object of the invention to provide a stand apparatus which is profitable, for example, when it is desired to largely move the medical optical instrument in a vertical direction like a ophthalmology operation, or when it is desired to largely move the medical optical instrument in a horizontal direction like a case where a spinal cord or medulla spinals of a backbone or a spine is operated, and further when observation is desired to be made from every directions without a focus of the medical optical instrument shifting like operation of otorhinology In order to achieve the above-described object, a stand apparatus for a medical optical instrument, according to the invention, is arranged such that a first link mechanism including a first pantograph arrangement has a proximal end which is mounted on a body having a horizontal groove, the body being rotatable about a vertical axis, the first pantograph arrangement has an intermediate section which is slidably engaged within the horizontal groove, and the first pantograph arrangement reciprocating linearly along a horizontal direction has a forward end on which a horizontal moving element having a vertical groove is mounted, that a second link mechanism including a second pantograph arrangement has a proximal end which is mounted on the horizontal moving element, the second pantograph arrangement has an intermediate section which is slidably engaged within the vertical groove in the horizontal moving element, and the medical optical instrument is supported at a forward end of the second pantograph arrangement which reciprocates linearly along a vertical direction, and that a counter weight for canceling a weight of the medical optical instrument is provided within the first link mechanism.

Since the horizontally moving element is mounted on the body by or through the first link mechanism including the first pantograph arrangement, the horizontally moving element reciprocates linearly along the horizontal direction similarly to linear movement of the intermediate section which is limited or restricted within the horizontal groove in the body. Further, since the first link mechanism includes the first pantograph arrangement, an amount of movement of the forward end (horizontal moving element) is larger than an amount of movement of the intermediate section, and is enlarged.

Furthermore, the second link mechanism including the second pantograph mechanism is mounted on the horizontal moving element, and the medical optical instrument is supported by the forward end of the second link mechanism. Accordingly, the medical optical instrument reciprocates linearly along the vertical direction similarly to linear movement of the intermediate section which is restricted or controlled within the vertical groove in the horizontal moving element. An amount of movement of the medical optical instrument is also enlarged more than an amount of movement of the intermediate section within the vertical groove, similarly to the previous horizontal moving element.

Moreover, since the counter weight which cancels a weight of the medical optical instrument is provided within the first link mechanism, even if the first link mechanism and/or the second link mechanism is/are deformed so that the medical optical instrument moves horizontal and/or vertical direction(s), a balance is held or retained as a whole, and the medical optical instrument per se is halted in air at a determined position.

DESCRIPTION OF THE PREFERRED EMBODIMENTS

A preferred embodiment of the invention will hereunder be described with reference to FIGS. 1 through 8. In this connection, in FIGS. 2 through 8 which are mechanism views, only the reference numerals, which become the points associated with the description of FIGS. 2 through 8, are applied to parts and elements, in order to avoid complication of the reference numerals and to ease understanding.

At the outset, general arrangement and movement thereof of a stand apparatus according to the invention will first be described schematically.

In this stand apparatus, three including a body 1, a horizontal moving element 2 and an operation microscope (medical optical instrument) 3 become the point in movement. That is, the horizontal moving element 2 is mounted on the body 1 through a first link mechanism 4. By modified or deformed movement of the first link mechanism 4, the horizontal moving element 2 is reciprocated linearly along horizontal directions A and B. The operation microscope 3 is mounted on the horizontal moving element 2 through a second link mechanism 5. By deformed movement of the second link mechanism 5, the operation microscope 3 is reciprocated linearly in vertical directions C and D. By composed or composite movement of the movement in the horizontal directions A and B and the movement in the vertical directions, it is possible to freely change or vary a position of the operation microscope 3. Further, a pair of counter weights $W_1$ and $W_2$ to be described later, which balance with weight and the like of the operation microscope 3, are provided within the first link mechanism 4. Accordingly, it is possible to halt the operation microscope 3 in air as it is while the operation microscope 3 is located on a moved position.

The details of the arrangement will next be described.

The body 1 is mounted on a base 6 arranged on a floor, rotatably about a vertical axis P in a direction $\theta_1$. The first link mechanism 4 has an upper side which includes a first pantograph arrangement 7.

Figure 8:
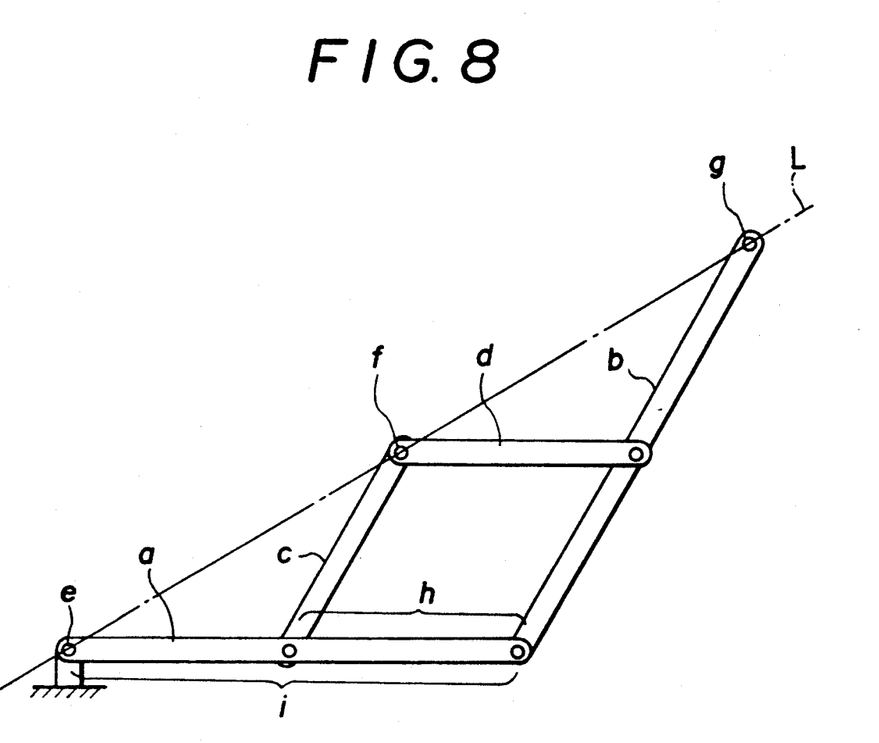
FIG. 8 is a view showing a principle of a pantograph arrangement.

Here, in order to assist or facilitate understanding of the description, the last FIG. 8 is used to describe, a little, the principle of a general pantograph arrangement. The pantograph arrangement is a four-node rotating arrangement which enlarges and reduces movement. A pair of long links (a) and (b) and a pair of short links (c) and (d) cooperate with each other to form a square quadrilateral, and a proximal end (e), an intermediate section (f) and a forward end (g) are all mounted on a straight line L. When the intermediate section (f) moves around the proximal end (e), the forward end (g) executes movement enlarged into a ratio of similitude of distances (h): (i). For example, when the intermediate section (f) moves a predetermined amount in the horizontal direction, the forward end (g) moves in the horizontal direction with an amount of movement larger than the amount of movement of the intermediate section (f). That is, movement of the intermediate section (f) is enlarged as it is. Accordingly, if pens are mounted on the intermediate section (f) and the forward end (g), respectively, so that a constant or predetermined figure is traced by the pen on the intermediate section (f), the pen on the forward end (g) describes or depicts a similar enlarged view of the figure traced by the intermediate section (f).

That is, the first pantograph arrangement 7 included in the first link mechanism 4 utilizes the aforesaid principle. Specifically, the first pantograph arrangement 7 comprises a long link 9 having a proximal end 8 which is mounted on the body 1, a long link 11 having a forward end 10 which is mounted on the horizontal moving element 2, and a pair of short links 12 and 13 for forming the square quadrilateral. The body 1 has an upper portion in which a horizontal groove 14 is formed. An intermediate pin (intermediate section) 15 is formed at a node between the short links 12 and 13 is slidably engaged within the horizontal groove 14. Furthermore, the forward end 10 of the first pantograph arrangement 7 is mounted on an upper portion of the horizontal moving element 2. The forward end 10, the intermediate pin 15, and the proximal end 8 are all mounted on a single straight line $L_1$ (refer to FIG. 2). This relationship does not change if the first link mechanism 4 moves. A node 16 between the long links 9 and 11 is mounted on one of corners of a triangular element 17. The triangular element 17 has a lower portion, and a link 18 under a condition that the link 18 extends in parallel relation to the long link 9 in the first pantograph arrangement 7 and a proximal end 17a is mounted on the body 1 has a forward end 19 which is connected to a corner of the lower portion of the triangular element 17. A link 21, which is in parallel to the other long link 11 and in which a forward end 20 is mounted on an upper portion of the horizontal moving element 2, has a halfway section 22 which is mounted the remaining corner of the triangular element 17. The link 21 has a proximal end 23 on which the first counter weight $W_1$ is mounted, and another link 24 in which the second counter weight $W_2$ is mounted on an opposite side is arranged horizontally. Moreover, a halfway section 25 of the link 24 and a halfway section 27 of a link 26 to be described later which extends upwardly from the horizontal moving element 2 are connected to each other through another link 28.

Figure 1:
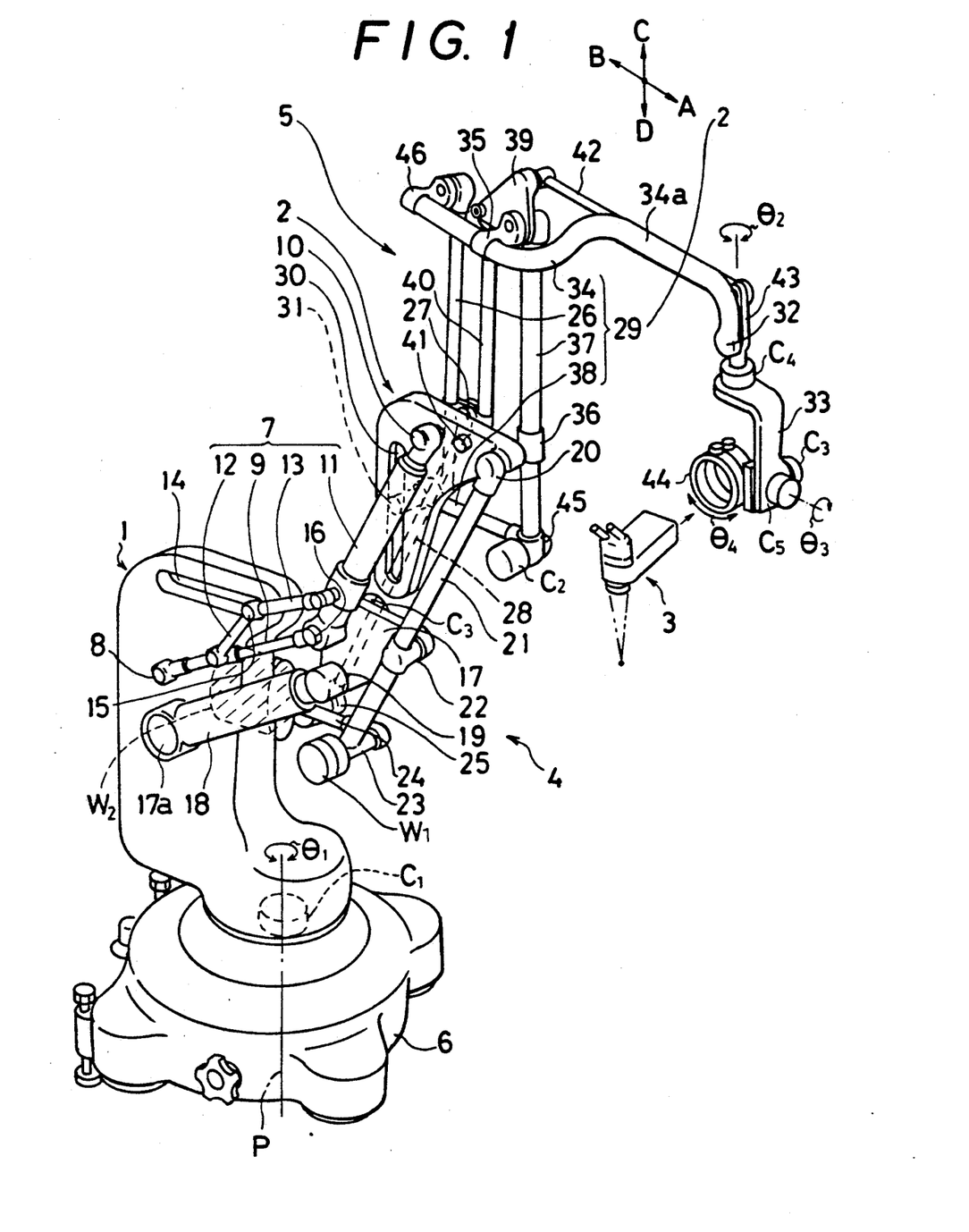
FIG. 1 is a perspective view of the entire arrangement showing a condition corresponding to FIG. 3 of a stand apparatus according to an embodiment of the invention.
Figure 2:
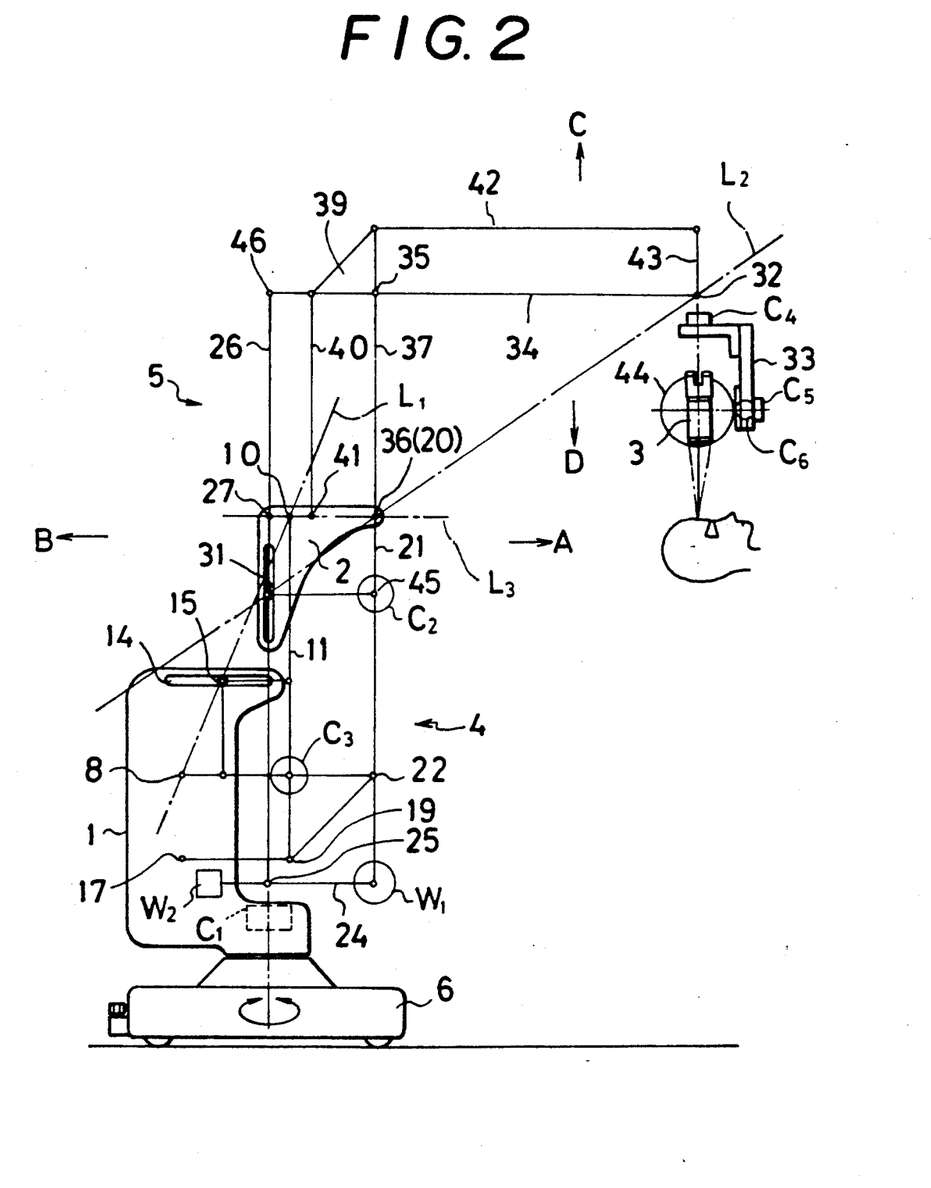
FIG. 2 is a view for mechanism of the stand apparatus under a normal or usual condition.
Figure 3:
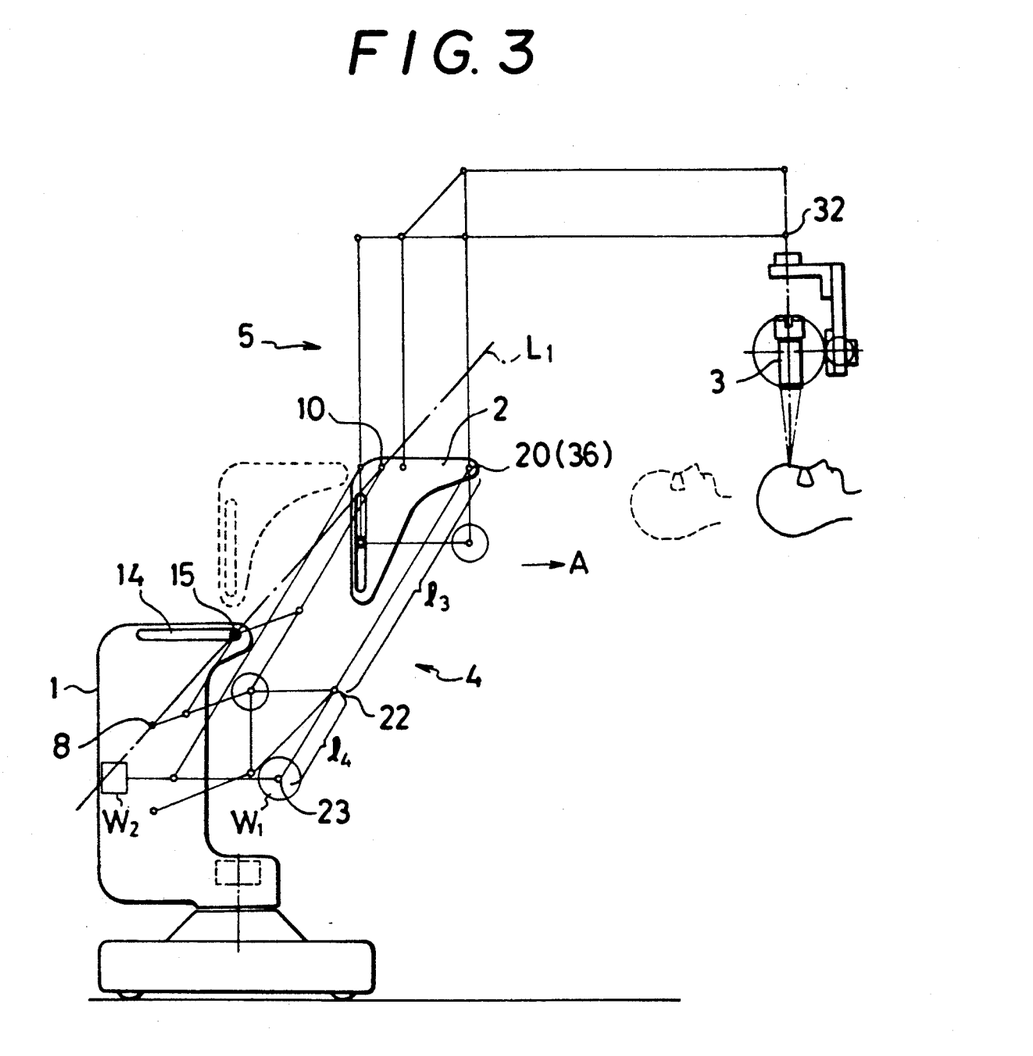
FIG. 3 is a view for mechanism showing a condition under which a horizontal moving element moves in a direction A.
Figure 4:
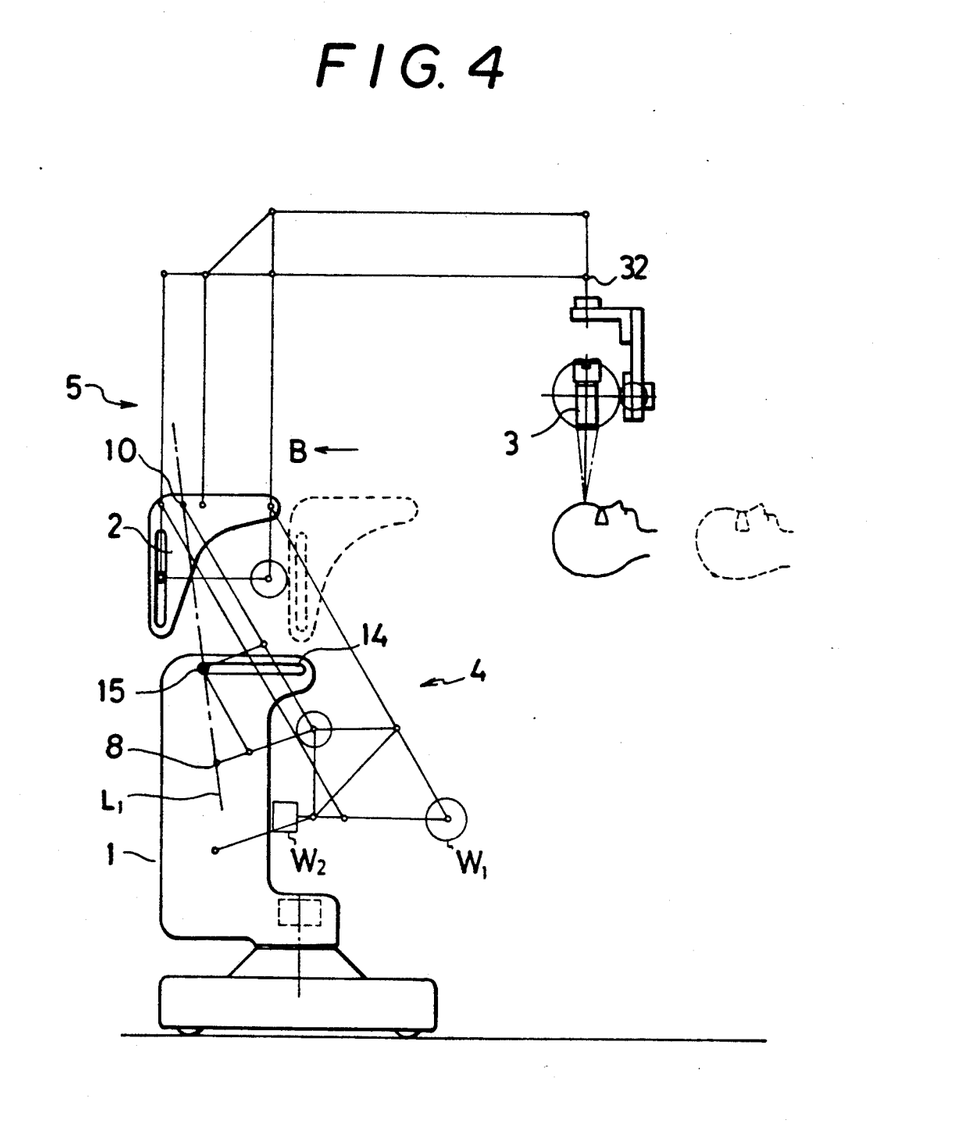
FIG. 4 is a view for mechanism showing a condition under which the horizontal moving element moves in a direction B.

As described above, since the horizontal moving element 2 is supported in air by the first link mechanism 4 which includes the first pantograph arrangement 7, the horizontal moving element 2 moves straight along the horizontal directions A and B in accordance with deformation of the first link mechanism 4 (first pantograph arrangement 7) (refer to FIGS. 3 and 4). That is, since straight movement of the intermediate pin 15 which slides within the horizontal groove 14 in the body 1 is enlarged at the forward end 10 of the first pantograph arrangement 7, the horizontal moving element 2 mounted on the forward end 10 can move straight by an enlarged amount of movement.

The second link mechanism 5, which is mounted on the horizontal moving element 2, will next be described. A second pantograph arrangement 29, which is included in the second link mechanism 5, comprises the aforesaid link 26 having a proximal end which is formed into an intermediate pin (intermediate section) 31 which is slidably engaged within a vertical groove 30 in the horizontal moving element 2, a link 34 having a curved section 34a which has a forward end 32 on which a support arm 33 for the operation microscope 3 is mounted and which has a proximal end 46 connected to an upper end of the link 26, a link 37 having one end which is mounted on a halfway section 35 of the link 34 and having a halfway section which is mounted to the corner of the horizontal moving element 2 as a proximal end 36, and a link 38 for connecting the other end of the link 37 and the intermediate pin 31 of the link 26 to each other. The second pantograph arrangement 29 has a modified arrangement which is slightly different from the basic or principal pantograph arrangement. In this connection, the curved section 34a of the link 34 is provided for avoiding interference with a head of a human being who uses the operation microscope 3. The forward end 32 of the link 34, the halfway proximal end 36 of the link 37 and the intermediate pin 31 of the link 26 are all mounted on a single straight line $L_2$ (refer to FIG. 2). This relationship does not also change even if the second link mechanism 5 moves. Since, in the second pantograph arrangement 29, a positional relationship between the proximal end 36 and the intermediate pin 31 is set reversely, straight movement of the intermediate pin 31 is enlarged toward the reverse direction at the forward end 32. That is, if the intermediate pin 31 moves downwardly, the forward end 32 moves upwardly. Further, one corner of a triangular element 39 is mounted on the halfway section 35 of the link 34, and a link 40 extending in parallel relation to the links 26 and 37 is mounted on other corner of the triangular element 39. The link 40 has a lower end 41 which is mounted on an upper portion of the horizontal moving element 2. The lower end 41, the forward end 10 of the link 11, the forward end 20 of the link 21, and the halfway section 27 of the link 26 are located on the same straight line $L_3$ which extends along the horizontal direction (refer to FIG. 2). This relationship is retained or held only in the case like FIG. 2. Another link 42 extending in parallel relation to the link 34 is mounted on the remaining corner of the triangular element 39. The link 42 has a forward end on which a vertical link 43 is mounted for vertically mounting the support arm 33 for the operation microscope 3 at a location of the forward end 32 of the link 34. A rotatable bearing section 44 is provided on the support arm 43, and the operation microscope 3 is set within the rotatable bearing section 44.

Figure 5:
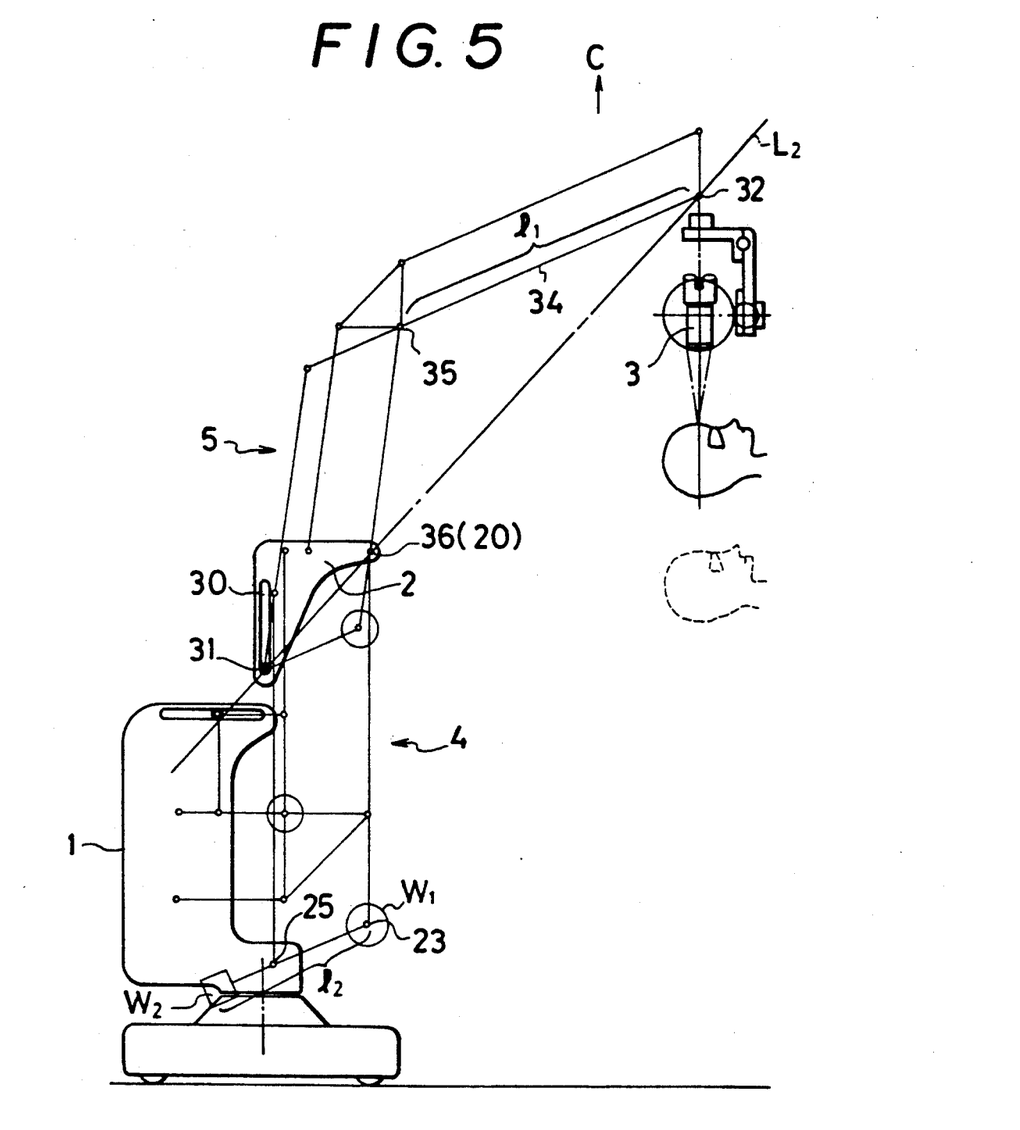
FIG. 5 is a view for mechanism showing a condition under which an operation microscope moves in a direction C.
Figure 6:
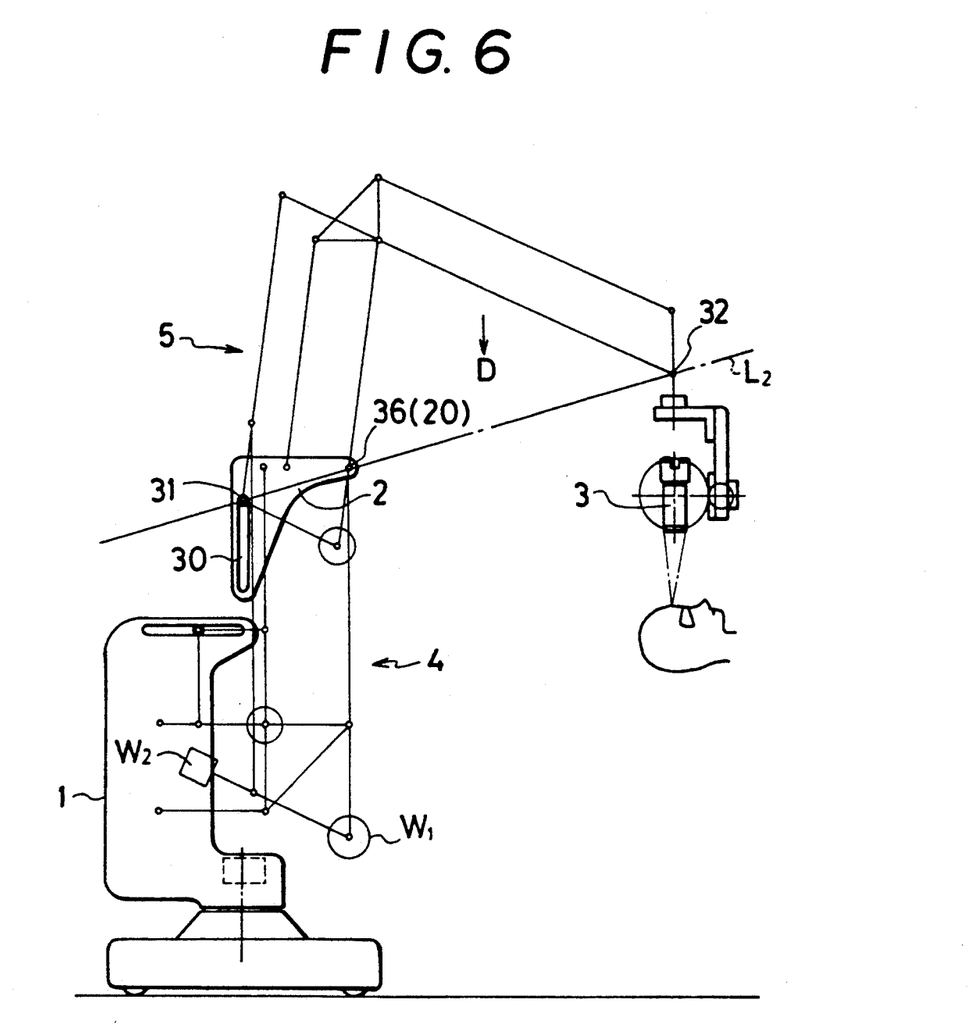
FIG. 6 is a view for mechanism showing a condition under which the operation microscope moves in a direction D.
Figure 7:
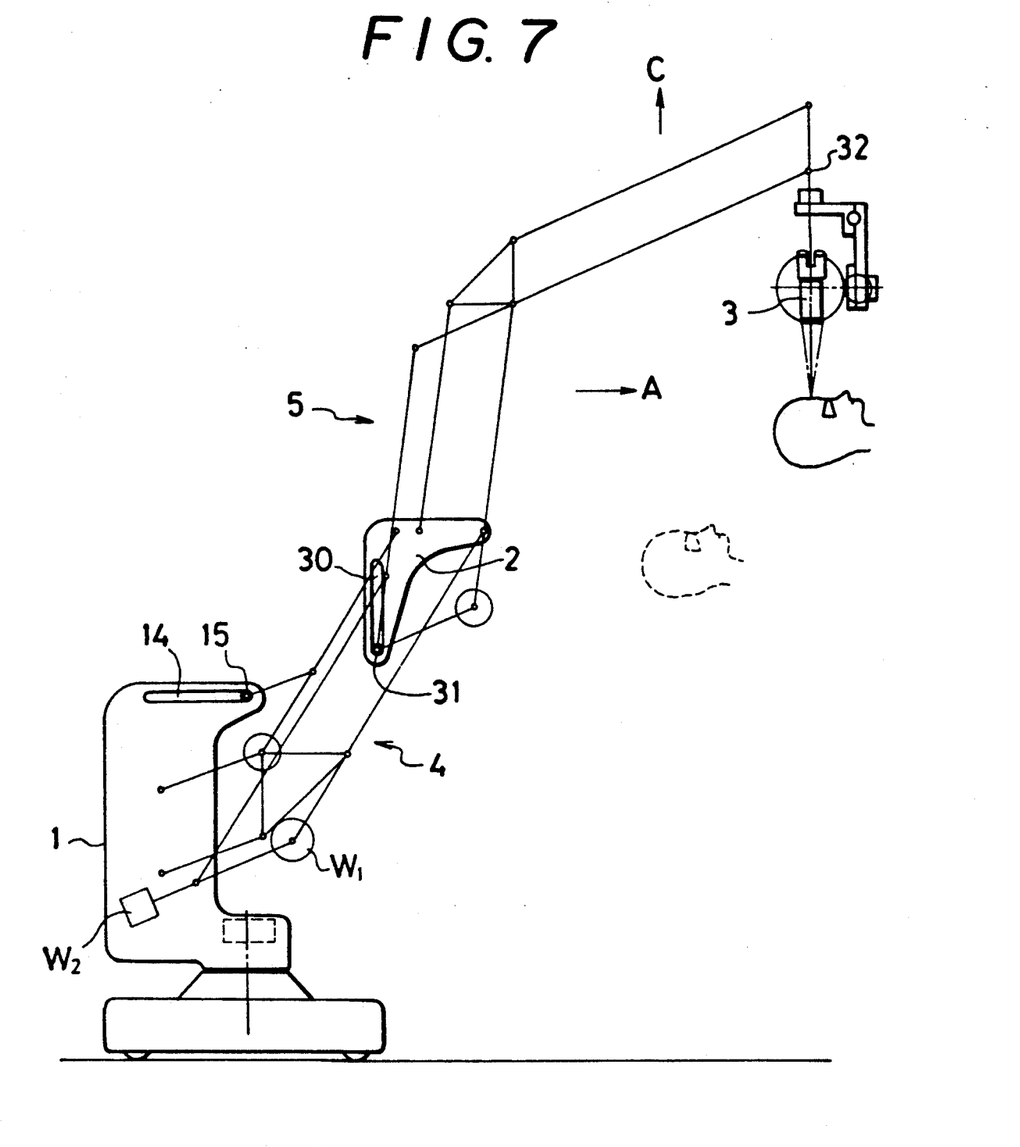
FIG. 7 is a view for mechanism showing a condition under which the operation microscope moves in a composite or synthetic direction of A and C.

As described above, since the operation microscope 3 is supported at the forward end 32 of the second link mechanism 5 which includes the second pantograph arrangement 29, the operation microscope 3 moves linearly along the vertical directions C and D in accordance with deformation of the second link mechanism 5 (second pantograph arrangement 29) (refer to FIGS. 5 and 6). That is, since the linear or straight movement of the intermediate pin 31 which slides within the vertical groove 30 in the horizontal moving element 2 is enlarged at the forward end 32 of the second pantograph arrangement 29, the operation microscope 3 mounted on the forward end 32 can execute linear movement by an enlarged amount of movement. As illustrated in FIG. 7, oblique movement in which the vertical movement and the horizontal movement are compounded with each other can naturally be executed.

Electromagnetic clutches are arranged respectively at movable parts of the above-described arrangement, so that a condition under which the movable parts are completed in movement can be fixed as they are. That is, an electromagnetic clutch $C_1$ is provided on the vertical axis P that is a center of rotation of the body 1, for locking rotational movement of the body 1 in the rotational direction $\theta_1$. An electromagnetic clutch $C_2$ is provided at a node 45 between the link 37 and the link 38 in the second pantograph arrangement 29, for fixing a position of the operation microscope 3 in the vertical directions C and D. Furthermore, an electromagnetic clutch $C_3$ is provided at a point of contact between the link 9 and the line 11 in the first pantograph arrangement 7, for fixing a position of the operation microscope 3 (horizontal moving element 2) in the horizontal directions A and B. Moreover, an electromagnetic clutch $C_4$ is provided on the vertical link 43 of the second link mechanism 5, for fixing a position of the support arm 33 in a predetermined rotational direction $\theta_2$. Further, an electromagnetic clutch $C_5$ is provided at the lower end of the support arm 33, for fixing a position of the operation microscope 3 in the rotational direction $\theta_3$. In addition, similarly, an electromagnetic clutch $C_6$ is also provided on the lower end of the support arm 33, for fixing a position where the operation microscope 3 is rotated along the direction $\theta_4$ through the rotatable bearing section 44.

The above-described motions in the vertical directions C and D and in the horizontal directions A and B are all retained in balance by the counter weights $W_1$ and $W_2$. Accordingly, after the electromagnetic clutches $C_2$ and $C_3$ have been freed, it is possible to operate the electromagnetic clutches $C_2$ and $C_3$ with a small operating force. That is, as a weight balance (moment) in the second link mechanism 5 which movably supports the operation microscope 3 in the vertical directions C and D, the operation microscope 3 supported by the forward end 32 of the link 34 acts, on one hand, in a direction raising the proximal end 46 with the halfway section 35 of the link 34 serving as a center. On the other hand, however, the proximal end 46 is raised or pulled downwardly by the counter weight $W_2$ which is provided on the link 24, through the links 26 and 28 and the like. Accordingly, it is necessary to retain the following relationship in the weight balance in the vertical directions C and D (refer to FIG. 5):

$$W \times l_1 = W_2 \times l_2$$

where
$l_1$ is a distance from the forward end 32 of the link 34 to the halfway section 35;
$l_2$ is a distance from the proximal end 23 to the halfway section 25; and
W is a weight of the operation microscope 3.

Further, it is also necessary for the weight balance in the horizontal directions A and B to retain the following relationship (refer to FIG. 3):

$$W' \times l_3 = (W_1 + W_2) \times l_4$$

where
W' is a whole weight of a portion upper than the horizontal moving element 2 including the operation microscope 3:
$l_3$ is a distance from the forward end 20 of the link 21 to the halfway section 22; and
$l_4$ is a distance from the halfway section 22 to the proximal end 23

The first link mechanism 4 and the second link mechanism 5 for the stand apparatus according to the embodiment may be operated manually, but may be operated by motors. Since the aforesaid balance is retained in the case also of motor driving, it is sufficient to utilize small motors.

In connection with the above, in the aforesaid description, an example has been indicated in which the horizontal moving element 2 moves horizontally with respect to the body 1, and the operation microscope 3 moves vertically with respect to the horizontal moving element 2. However, the arrangement may be such that the horizontal moving element 2 moves vertically with respect to the body as "vertical moving element", and the operation microscope 3 moves horizontally with respect to "vertical moving element". In this case, the arrangement is such that a vertical groove is formed in the body, and a horizontal groove is formed in "vertical moving element". Furthermore, it is unnecessary to divide the counter weight to $W_1$ and $W_2$. The arrangement may be such that a single elongated counter weight is provided along the link 24.

The stand apparatus for the medical optical instrument according to the invention has the contents described above. Accordingly, it is possible to move the medical optical instrument straight in the horizontal and vertical directions, and it is possible to increases the amount of movement. Accordingly, it is useful or profitable when it is desired to move the medical optical instrument largely in the vertical direction like an ophthalmology operation, and when it is desired to move the medical optical instrument largely in the horizontal direction like a case where the spinal cord of the spine is operated, or when it is desired to observe affected or diseased part from every directions like operation of otorhinology without the focus shifting.

Further, since balance is retained by the counter weights, operation can be executed rapidly and accurately without a large force. Furthermore, the medical optical instrument is halted in air as it is at the location where the medical optical instrument moves.

Moreover, according to the embodiment of the invention, since the counter weights are located below the stand apparatus, an outer appearance of the stand apparatus is refreshed, and an attempt can be made to maintain stability. Compactification of the stand apparatus is easy to be realized.

What is claimed is:

1. A stand apparatus for a medical optical instrument, wherein a first link mechanism including a first pantograph arrangement has a proximal end which is mounted on a body having a horizontal groove, said body being rotatable about a vertical axis, said first pantograph arrangement has an intermediate section which is slidably engaged within said horizontal groove, and said first pantograph arrangement reciprocating linearly along a horizontal direction has a forward end on which a horizontal moving element having a vertical groove is mounted, wherein a second link mechanism including a second pantograph arrangement has a proximal end which is mounted on said horizontal moving element, said second pantograph arrangement has an intermediate section which is slidably engaged within said vertical groove in said horizontal moving element, and said medical optical instrument is supported at a forward end of said second pantograph arrangement which reciprocates linearly along a vertical direction, and wherein a counter weight for canceling a weight of said medical optical instrument is provided within said first link mechanism.

2. A stand apparatus for a medical optical instrument, according to claim 1, wherein a vertical groove is formed in said body, wherein said horizontal moving element is formed into a vertical moving element having a horizontal groove, wherein said vertical moving element reciprocates linearly along a vertical direction by said first link mechanism, and wherein said medical optical instrument reciprocates linearly along a horizontal direction at the forward end of said second link mechanism which is mounted on said vertical moving element.

* * * * *